April 26, 1966 — E. P. HARSANYI — 3,248,060
APPARATUS FOR TRITURATING SOLID MATERIALS
Filed Sept. 10, 1962 — 2 Sheets-Sheet 1

April 26, 1966    E. P. HARSANYI    3,248,060
APPARATUS FOR TRITURATING SOLID MATERIALS
Filed Sept. 10, 1962    2 Sheets-Sheet 2
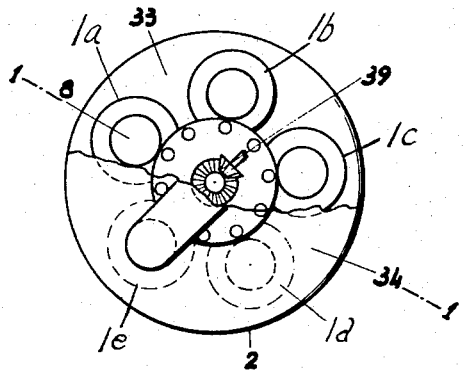
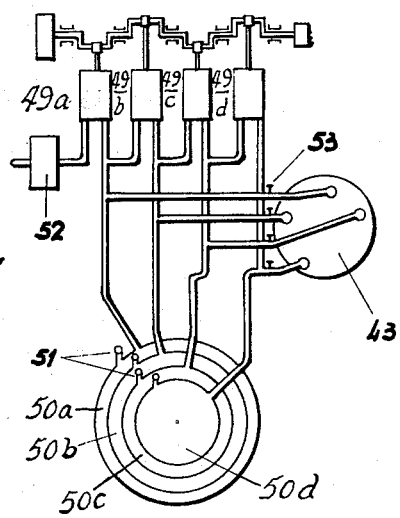
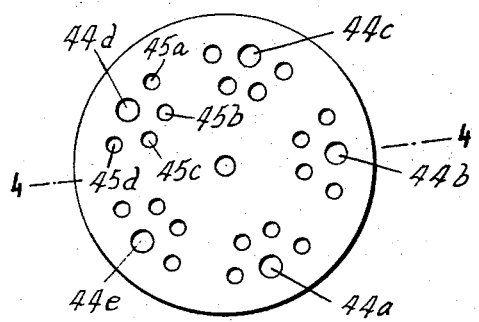
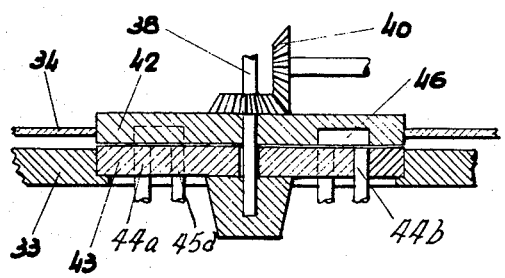
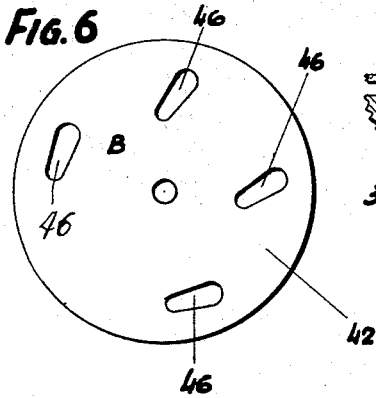
Eugene P. Harsanyi
Inventor
By Wenderoth, Lind and Ponack
Attorneys

United States Patent Office 3,248,060
Patented Apr. 26, 1966

3,248,060
APPARATUS FOR TRITURATING SOLID MATERIALS
Eugene P. Harsanyi, Buenos Aires, Argentina, assignor, by mesne assignments, to Deton Aktiengesellschaft, a company of Liechtenstein
Filed Sept. 10, 1962, Ser. No. 222,537
2 Claims. (Cl. 241—1)

The method described in the U.S. Patent 2,807,560 for breaking up sugarbeet, according to which the beets are subjected to high air- or steam pressure and thereupon, by rapid release of the same, are completely burst, has important advantages as compared with the usual diffusion process and could also be employed advantageously for the extraction of the juice of sugar cane, medicinal plants, olives, pasture plants and not only for juice extraction but generally for triturating materials adapted to be poured, if necessary after preliminary breaking up and, capable of absorbing sufficient compressed air, such as meat, fishes, bones, pumice. The known methods, however, are not satisfactory for industrial application owing to lack of economy.

The present invention has for its object improvements, relating to the said bursting process, as well as to a plant which enables its continuous and completely automatic working. Another object is to economize as much as possible the consumption of compressed air and to exploit its compression heat.

The efficiency of the said bursting process, especially if applied to cellular materials, requires a properly timed successive increase of the air pressure and sufficient length of time to allow the penetration of the cell membranes according to their hardness and permeability.

The process according to the present invention consists in subjecting the material to be treated to different successively higher levels of air pressure in a plurality of separate pressure receptacles, augmenting the pressure in each one of the series of pressure receptacles and releasing the pressure only in the pressure receptacle under the highest pressure to discharge the burst material into a separate chamber of bigger volume than the pressure receptacle and thereupon reloading and putting said unloaded pressure receptacle under pressure at the lowest pressure level. In practice the pressures in each one of the pressure receptacles is one level higher than the next successive receptacle, the receptacles moving up the scale of pressure levels until each reaches the highest level, at which point it is discharged, reloaded and again started through the cycle.

The plant for performing the process according to the present invention comprises a plurality of vertical cylindrical pressure receptacles arranged in a circle within a brusting chamber of larger volume and coaxial with the said circle, pneumatically controlled upper charging and lower discharging valves on the said pressure receptacles, a radial charging channel rotatably mounted on a shaft coaxial with the said circle and rotatably connected with a charging tunnel positioned above the said charging channel, a plurality of compressed air tanks provided with safety valves adapted to discharge at different pressure levels and compressed air distributing means adapted to connect the several pressure receptacles alternatively with the said compressed air tanks.

An example of the plant according to the present invention is shown in the annexed diagrammatical drawings, in which:

FIG. 2 is a partial cross section of the chamber of FIG. 1.

FIG. 3 is a diagram showing the connection between a compressor and the pressure receptacles through a rotary valve.

FIG. 4 is a vertical section, on an enlarged scale, of the rotary valve.

FIG. 5 is a plan view of a part of the rotary valve showing the distribution of the openings of the rotary valve; and FIG. 6 is a plan view of a part of the rotary valve showing connecting channels in the rotary valve.

Figure 1:
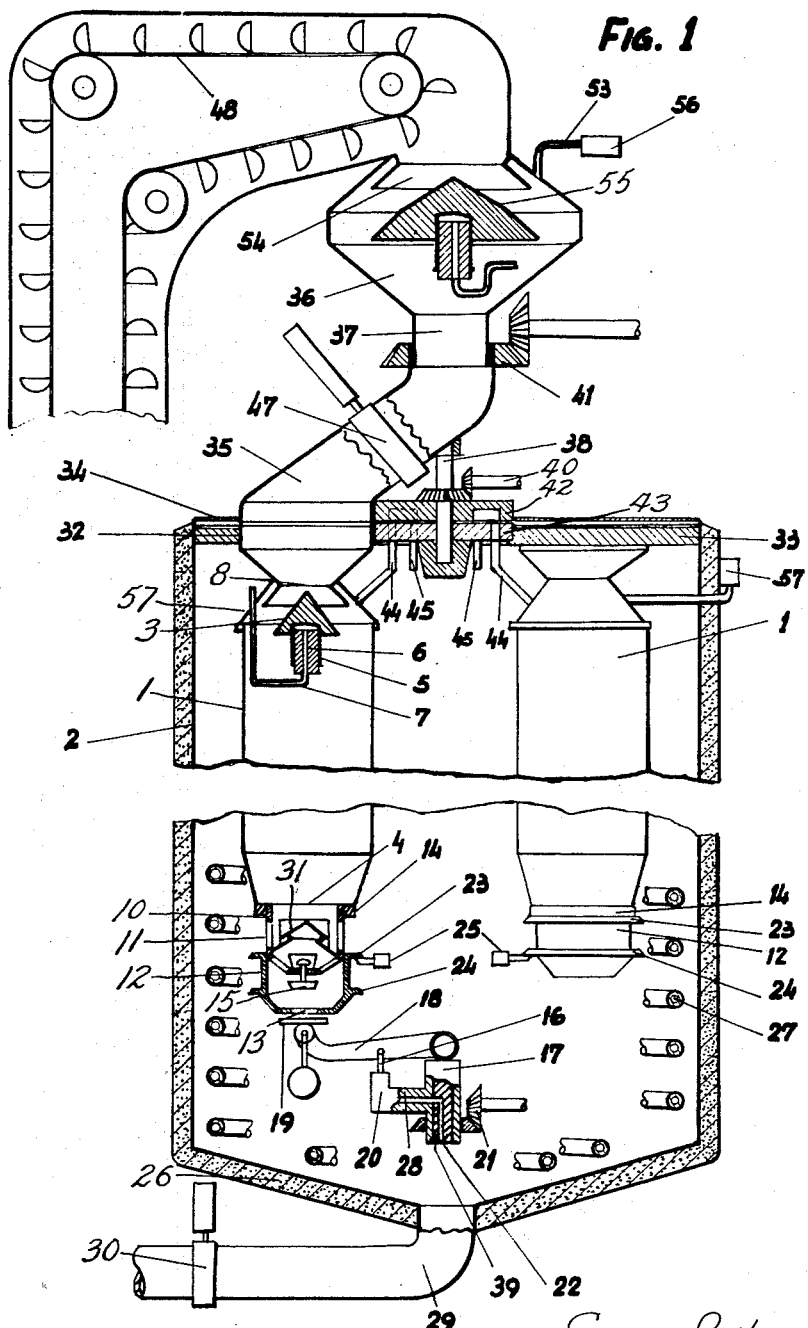
FIG. 1 is a vertical section of the bursting chamber with the pressure receptacles therein.

According to the example shown in the drawing, five tubular pressure receptacles 1a, 1b, 1c, 1d and 1e, whose length is a multiple of their diameter, are arranged in circle, within a cylindrical bursting chamber 2, with a volume sufficiently large to produce the required bursting effect by the release of the compressed air when releasing the contents of a pressure receptacle into chamber 2. The upper charging opening 8 of the receptacles 1a–1b is provided with an inner conical valve 3 carried by a cylinder 5 sliding on a stationary piston 6 provided with a channel 7 through which compressed air can be admitted below the cylinder to raise valve 3. Each of the receptacles 1a–1e is provided with a discharge opening 4 at the bottom thereof, and has a cylindrical extension 10 thereon with openings 11 and with a double cone 31, with a gap between the cone parts. The openings 11 in the extension 10 are closed by a slide 12, having a bottom opening 13 adapted to be closed by a valve 15 suspended from the bottom of the extension 10. The slide 12 is provided with an upper rim 23 and a lower rim 24, which may engage with remotely controlled ratchets 25 securing the slide 12 in either its upper or lower position. In the upper position the slide 12 abuts against an elastic sealing ring 14.

Below the pressure receptacles 1a–1e, in the center of the bursting chamber 2 is located the stationary pivot 39 bearing the sleeve 17 with an arm 28 and a cylinder 20 thereon. The cylinder 20 has therein a piston 16 which operates a lever 18 pivoted at one end to sleeve 17 and carrying on its free end the disc 19 oscillatingly mounted thereon. By means of the bevel pinions 21 the arm 18 can be moved under any one of the slides 12 to lift them.

A serpentine tube 27 in the chamber 2 has cooling water from a compressor flowing therein and tempers the air released into the chamber which is cooled by its expansion. The chamber 2 is covered by a sound muffling mantle 26.

The charging openings 8 of the pressure receptacles 1a–1e are provided with funnels 32, having an upper opening flush with the top wall 33 of the chamber 2. The top wall 33 is covered by an annular plate 34 into which opens a discharge channel 35 supported by a stationary central shaft 38, and the channel 35 can be rotated by means of the pinion gear 41.

Into the upper end of the discharge channel projects the discharge end 37 of the charging funnel 36.

On the top wall 33 of the chamber 2 is mounted the stationary member 43 of the air distributing means, and a distributing slide 42 for the compressed air is rotatably mounted on the stationary shaft 38. The bevel pinion gear 40 serves to rotate the slide 42 into various positions to connect the tubes 44 leading to the several pressure receptacles 1a–1e with the tubes 45 leading to the compressed air source having the required pressure level. If there are four different sources of compressed air, i.e. of 2 atm., 4 atm., 8 atm. and 16 atm. pressure, the stationary member 43 (FIG. 5) of the air distributing means is provided with five openings 44a, 44b, 44c, 44d and 44e, each being connected with one of the pressure receptacles 1a–1e, and each of the said openings is surrounded by four openings 45a, 45b, 45c and 45d connected with the compressed air tank under the pressure of 2, 4, 8 and 16 atm.

respectively. The rotary member 42 (FIG. 6) of the slide is provided with four connecting channels 46 directed to connect the openings 44 of the stationary member of the slide with one of the openings 45 of the several groups of four. There is no connecting channel 46 in the stationary member of the slide at the point corresponding to the space between the openings 46 connecting an opening 45a with opening 44 and an opening 45d and on opening 44.

In the charging tube 35 is located a pneumatically operated lock 47. A transport chain 48 is provided to charge the charging funnel 36. The chain 48 is started or stopped according to the quantity of material in the funnel 36, which is controlled electrostatically in a known manner.

As the funnel 36 has to receive sufficient quantity of material to fill a pressure receptacle and if the nature of the material does not ensure that it will drop into the receptacle during the time provided for this purpose, it will be necessary to aid it by air pressure. For this purpose the opening 54 will be closed by a valve 55 actuated by compressed air and an outlet 53 for the compressed air is provided, which is controlled by an electrically operated valve 56. The charging valve 3 of the receptacles 1b–1e being open during the charging period, permits the escape of the air contained in the receptacle during its charging.

The compressed air is produced preferably by a four cylinder compressor (FIG. 3), whose cylinders 49a, 49b, 49c and 49d produce the required pressures and respectively charge the compressed air tanks 50a, 50b, 50c and 50d for the various pressures. The tanks of the higher pressure air are enclosed by the tanks of the lower pressure air. Each tank is provided with a safety valve 51 opening into the tank of the next lower pressure and that of the lowest opens into the atmosphere. The pressures maintained in the several tanks should be somewhat higher than those to which the several pressure receptacles are to be charged.

The cylinder 49a aspires free air through the filter 52 and compresses it into tank 50a, from which cylinder 49b sucks and compresses into tank 50b, while cylinder 49c receives the compressed air from tank 50b, compresses it into tank 50c, and cylinder 49d takes compressed air from tank 50c to compress it into tank 50c. The tank 50d is provided with a manometer controlling the motor driving the compressor to stop it, if the pressure in the said tank rises unduly, and starts it again if the pressure sinks below the allowed value. The several tanks are connected by means of ducts 53 with the distributing slide 43.

The plant is provided with an electric program control which is of a conventional type in order to perform the controls according to the following description.

The working cycle, assumed to be 5 minutes, may be started with the sluice 47 of the charging tube 36 closed, the charging funnel 36 is filled and the charging chain 48 is stopped. The pressure receptacles 1a–1d being charged and put under air pressure from the respective tanks and the pressure in the tank 1e is the highest, viz. 16 atm. at the beginning of the first minute of the working cycle. The lever 18 with its disc 19 is below the pressure receptacle 1e with the disc 19 at its lowest position. The connection of the receptacle 1e with the tank 50d is interrupted. The sluice 30 in the discharge channel 29 of the bursting chamber 2 is opened, hence the air pressure in the said chamber is the lowest, i.e. 1 atm.

The program control releases the slide 12 of the receptacle 1e secured in its closing position by means of the ratchet 25 engaging the rim 24 of the slide 12 and the pressure within the receptacle pushes the slide 12 downwards. The contents of the receptacle are discharged through the openings 12 into the chamber 12. The program control connects the channel 7 of the charging valve 3 with the atmosphere, whereby the charging opening 8 is opened. At the same time sluice 47 of the charging tube 35 is opened. By admitting compressed air into cylinder 20 the slide 12 is pushed into its closing position, in which it is secured by the ratchet 25 and the receptacle 1e is filled with the material dropping therein. The valve 15 closes the opening 13 of slide 12 and after the receptacle 1e has been charged, and the valve 3 is closed by compressed air, admitted through piston 6.

Sluice 47 is closed and charging tube 35 is rotated into the position for charging receptacle 1a. Valves 56 and 55 are opened and the charging chain 48 is started. The receptacles 1a–1d have been connected during this time with the respective tanks 50a–50d (FIG. 3) of higher pressure level. All these operations are performed during the first minute of the period of 5 minutes.

At the end of the first minute the pressures in the receptacles 1a–1d have reached 2 to 16 atm. respectively. At the beginning of the second minute the slide 42 is rotated, disconnecting receptacle 1d from tank 50d, connecting tank 1e to tank 50a and connecting tanks 1a–1c to tanks 50b–50d respectively. The above cycle is repeated and the contents of receptacle 1d will be burst in the above described manner. At the end of the second minute the receptacle 1d has been freshly charged and the pressures in the receptacles 1e, 1a–1c will be raised to 2–16 atm. respectively.

During the third minute the contents of receptacle 1c will be burst and receptacle 1c will be reloaded and the pressures in the receptacles 1d, 1e, 1a and 1b will be raised to 2–16 atm. respectively.

During the fourth minute the contents of receptacle 1b will be burst and receptacle 1b will be refilled and the pressures in the receptacles 1c–1e and 1a will be raised to 2–16 atm. respectively.

During the fifth minute the contents of receptacle 1a will be burst and receptacle 1a will be filled and the pressures in the receptacles 1b–1e will be raised to 2–16 atm. at which time the conditions at the beginning of the period of 5 minutes will be reestablished.

It will be understood that the pressure will be raised to its highest value of 16 atm. over a period of more than 4 minutes of each cycle and one bursting will take place in each minute of the cycle.

The performance of the plant is determined by the volume of the receptacles. If the duration of a cycle is 5 minutes, the diameter of the receptacle is 40 cm. and its height is 3 m., the volume bursted per minute will be 0.3798 m.$^3$, per hour 22.6 m.$^3$ and per day of 24 working hours, 542 m.$^3$. The whole floor surface occupied by the bursting tower will have only a diameter of 1.60 m.

What I claim is:

1. An apparatus for triturating solid materials adapted to be poured and capable of absorbing sufficient compressed air to burst when the pressure is released, comprising a bursting chamber having a bottom outlet, a plurality of vertically positioned pressure vessels fixedly mounted within said bursting chamber and arranged in a circle, a remotely controlled charging valve on the top of each vessel and a remotely controlled discharging valve on the bottom of each vessel, a charging conduit extending substantially radially of the circle in which said vessels are positioned at the upper ends of said vessels and being rotatable about the center of said circle and having a discharge end adapted to be aligned with successive charging valves on the vessels, a charging funnel positioned above the other end of said charging conduit to which the said other end of said charging conduit is rotatably connected, sources of supply for a plurality of air pressures, and compressed air distributing means connected between said sources of supply for the air pressures and said pressure vessels for distributing different air pressures to the various vessels at different times.

2. An apparatus as claimed in claim 1 in which said compressed air distributing means comprises valve means rotatable with said charging conduit and connecting the vessel on one side of the vessel over which the charging conduit discharge end is positioned to the highest pressure source of air, connecting the next adjacent vessel to the next lower pressure source of air, and connecting the successive vessels to successively lower pressure sources of air with the vessel on the other side of the vessel over which the discharge end of the charging conduit is positioned being connected to the lowest pressure source of air.

References Cited by the Examiner

UNITED STATES PATENTS

| | | | |
|---|---|---|---|
| 1,442,304 | 1/1923 | Spencer et al. | 99—238 |
| 2,807,560 | 9/1957 | Brownell et al. | 127—43 |

MORRIS O. WOLK, *Primary Examiner.*